SINGLE RECORD TELEPHONE ANSWERING AND RECORDING DEVICE

Filed Nov. 2, 1967 8 Sheets-Sheet 1

INVENTOR
Leonard Rubenstein

BY Dodio and Montgomery
ATTORNEYS

INVENTOR
Leonard Rubenstein

BY Dedio and Montgomery
ATTORNEYS

INVENTOR
Leonard Rubenstein
BY
DeLio and Montgomery
ATTORNEYS

INVENTOR
Leonard Rubenstein

BY De Lio and Montgomery
ATTORNEYS

INVENTOR
Leonard Rubenstein

BY Dedic and Montgomery
ATTORNEYS

INVENTOR
Leonard Rubenstein
BY
Dedio and Montgomery
ATTORNEYS

Nov. 10, 1970 L. RUBENSTEIN 3,539,728

SINGLE RECORD TELEPHONE ANSWERING AND RECORDING DEVICE

Filed Nov. 2, 1967 8 Sheets-Sheet 7

INVENTOR
Leonard Rubenstein

BY Dezzio and Montgomery
ATTORNEYS

INVENTOR
Leonard Rubenstein

BY De Lio and Montgomery
ATTORNEYS 3,539,728
Patented Nov. 10, 1970

1

3,539,728

SINGLE RECORD TELEPHONE ANSWERING AND RECORDING DEVICE

Leonard Rubenstein, London, England, assignor to Learning Appliances Limited, London, England Continuation-in-part of application Ser. No. 632,489, Mar. 22, 1967. This application Nov. 2, 1967, Ser. No. 680,102
Claims priority, application Great Britain, Mar. 24, 1966, 13,008/66; June 8, 1966, 25,472/66
Int. Cl. H04m *1/64*; G11b *15/02*
U.S. Cl. 179—6 36 Claims

ABSTRACT OF THE DISCLOSURE

Telephone answering devices which employ a tape having pre-recorded answering announcements on spaced sections thereof. When an incoming ringing current is detected by a device, driving means drive the tape from a supply spool to a take-up spool, via a recording and playback head. Switching means, coupled to one of the spools, switch the device to its "playback mode" when one of the sections is passing the head and to its "record mode" when tape intermediate the sections is passing the head. Synchronisation between the tape and the mode of operation of the device is maintained even if slipping takes place between the tape and the driving means.

BACKGROUND OF THE INVENTION

This application is a continuation-in-part of my copending application Ser. No. 632,489, filed on Mar. 22, 1967, now abandoned which relates to telephone answering devices.

STATEMENT OF THE INVENTION

The invention consists in a telephone answering and recording device for operation with a magnetic tape having telephone answering announcements recorded on sections thereof which are spaced lengthwise of the tape, comprising means for rotatably mounting supply and take-up spools for the tape, means for driving tape from the supply spool to the take-up spool, a recording and playback head arranged at a predetermined location on the path of tape between the spools, amplifier means, means for detecting an incoming ringing current on a telephone line and, upon detection, causing operation of the driving means, switching means, and means coupling the switching means to one of the spools so that rotation of the said one of the spools causes operation of the switching means to provide a low resistance D.C. path to render the line in a condition suitable for operation, to couple the amplifier input to the head and the amplifier output to the line whilst one of the recorder sections of the tape is adjacent the head, and to reverse these couplings when a part of the tape intermediate the recorded sections is adjacent the head.

The invention will now be described, by way of example, with reference to the accompanying drawings, in which.

2

Figures 3, 4, 5A, 5B:
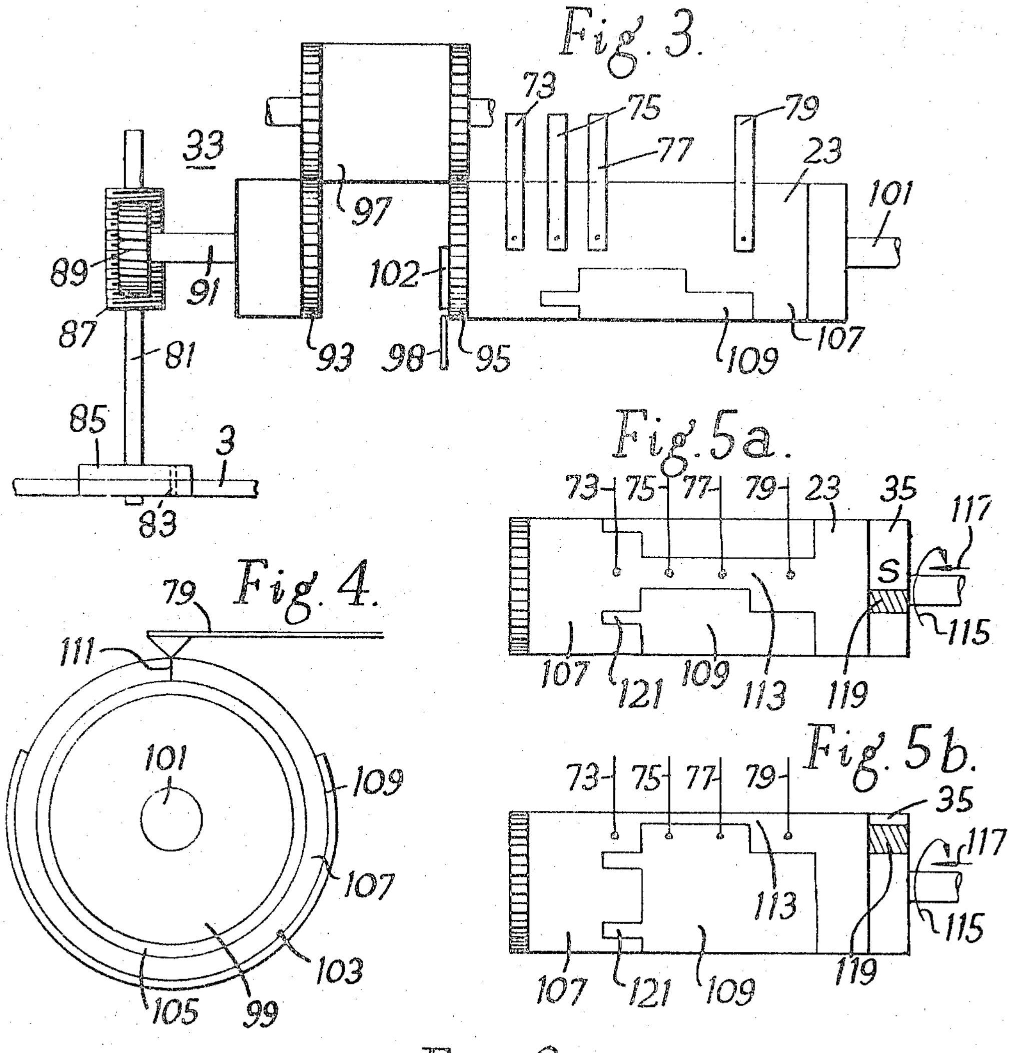
Figure 6:
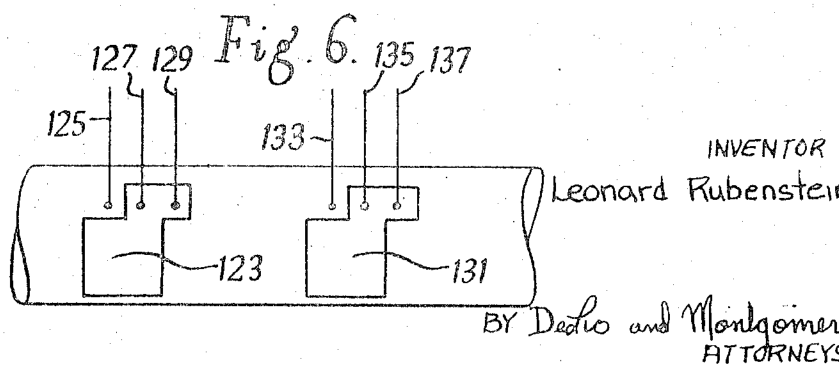
Figure 2:
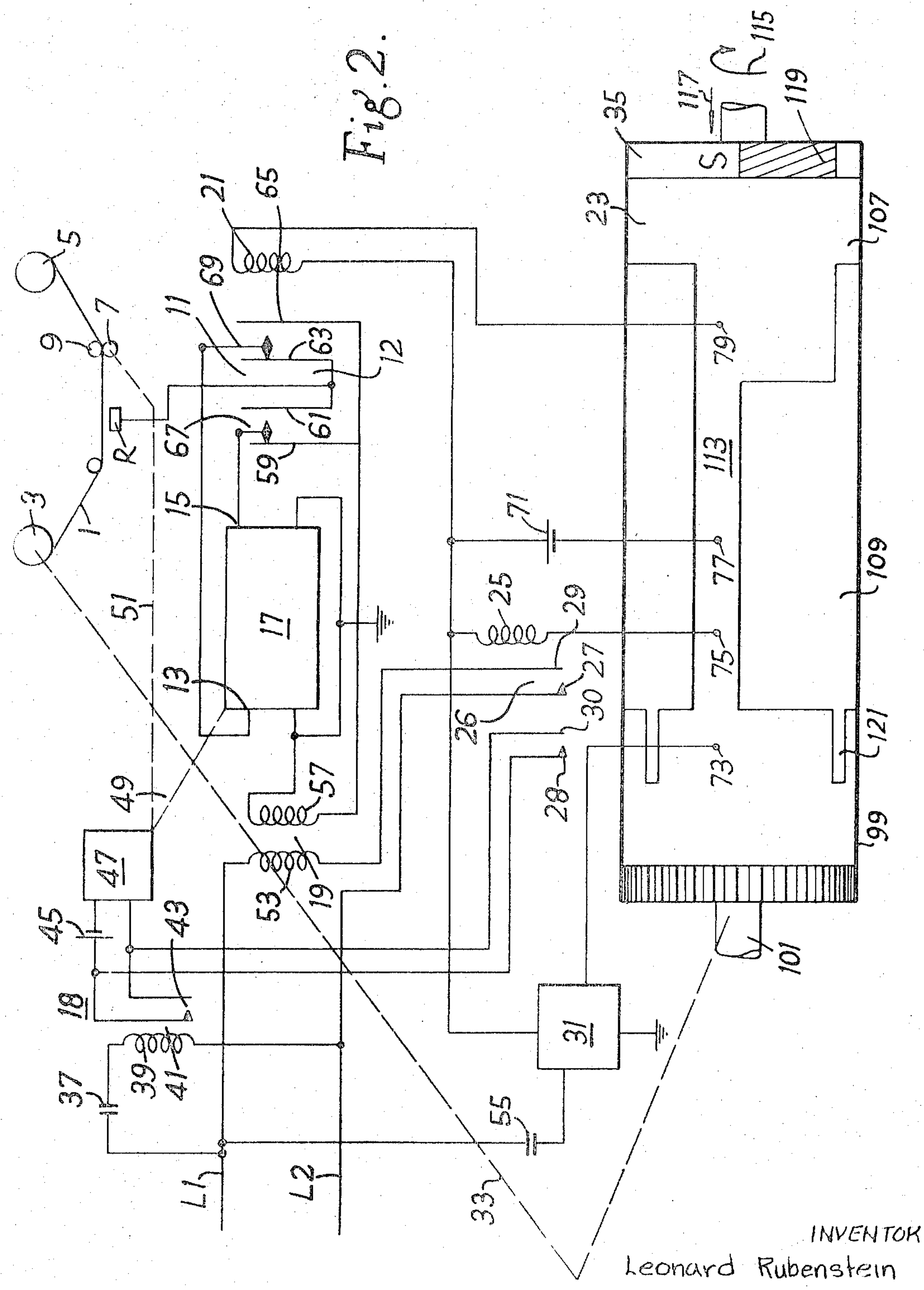
FIG. 2 is an electrical circuit of a telephone answering and recording device according to the invention.
Figure 7:
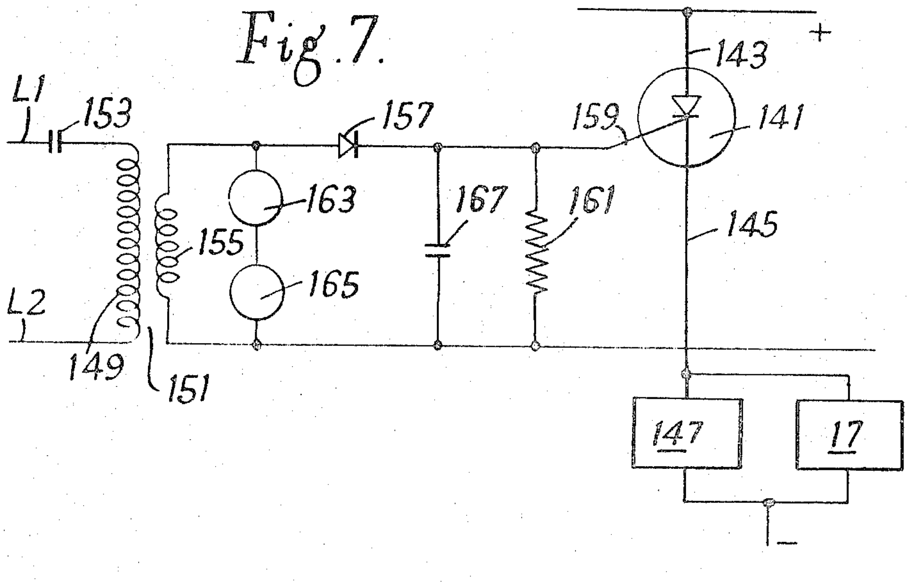
Figure 8:
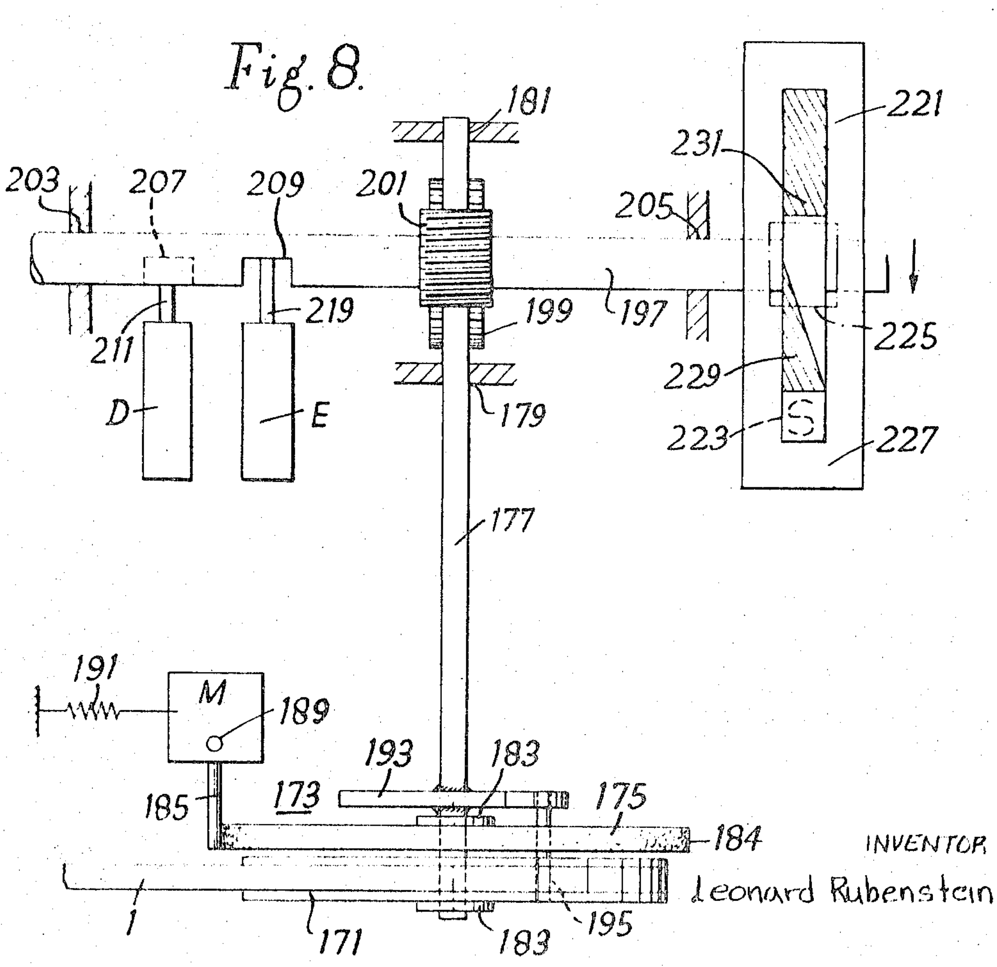
Figure 9A:
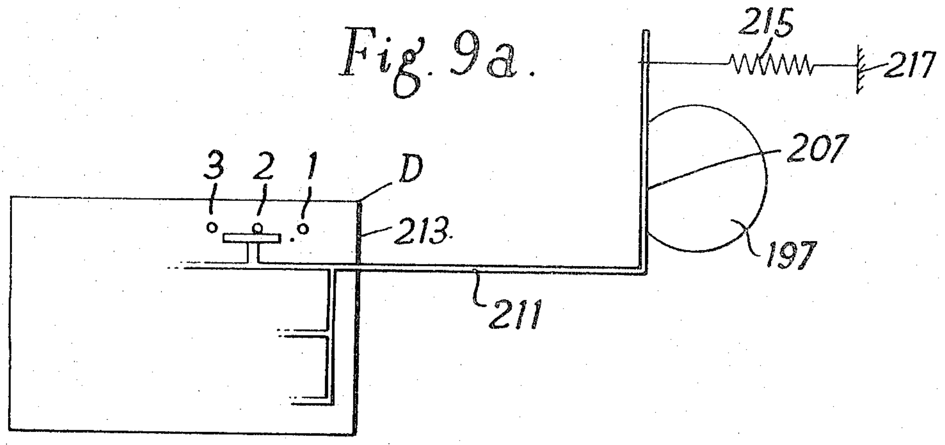
Figure 9B:
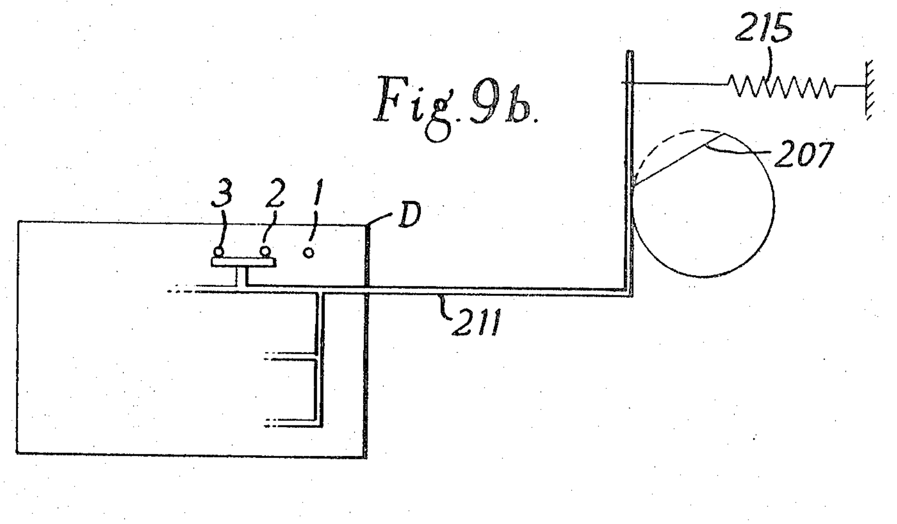
Figure 10A:
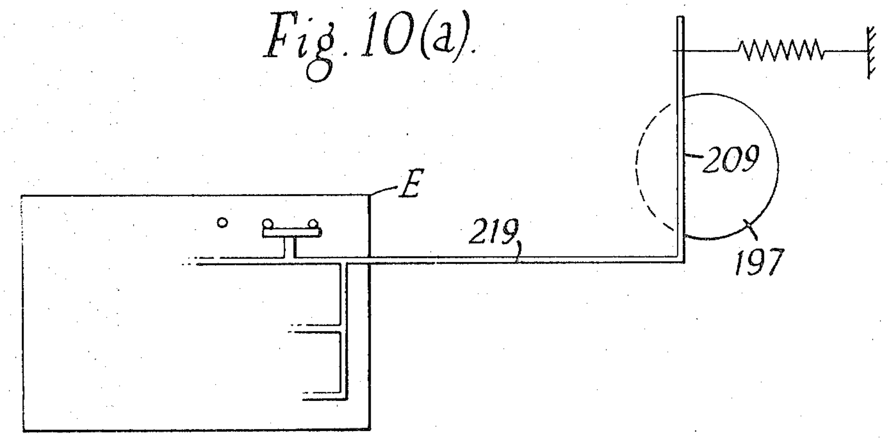
Figure 10B:
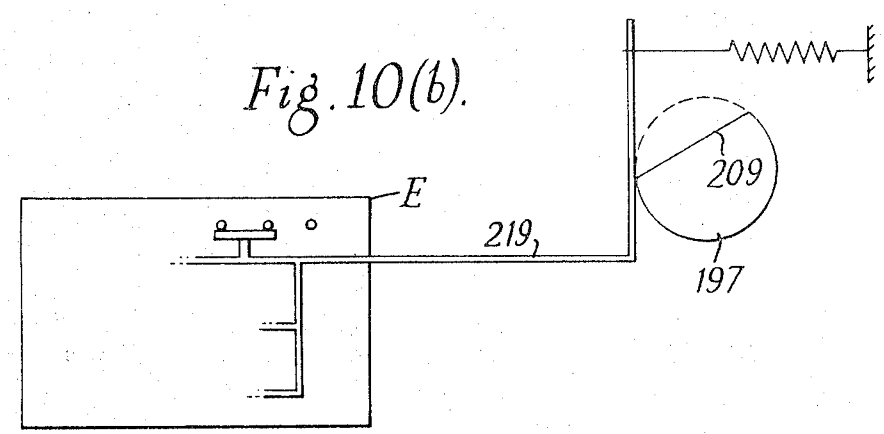
Figure 12:
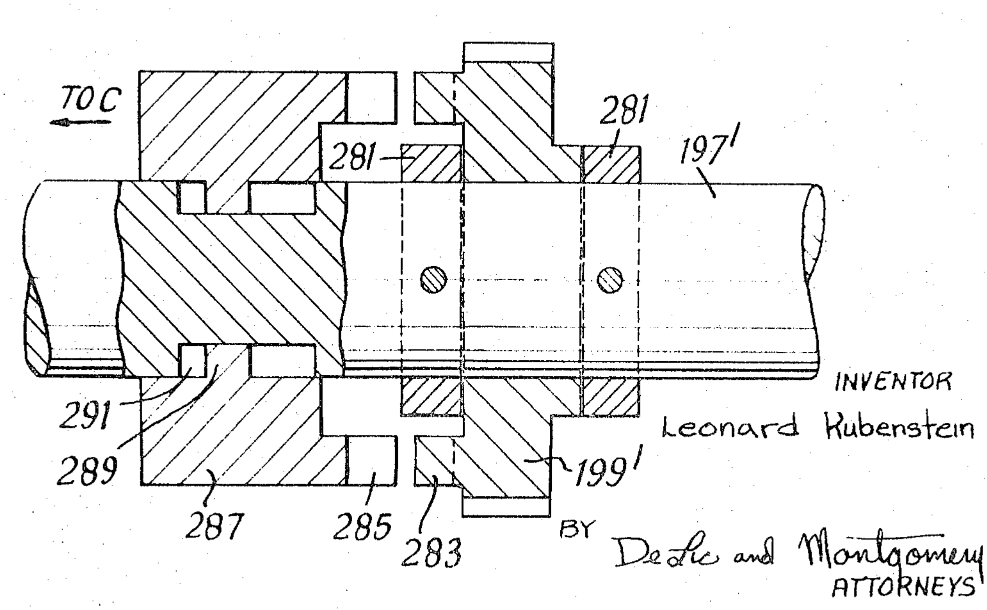
Figure 11:
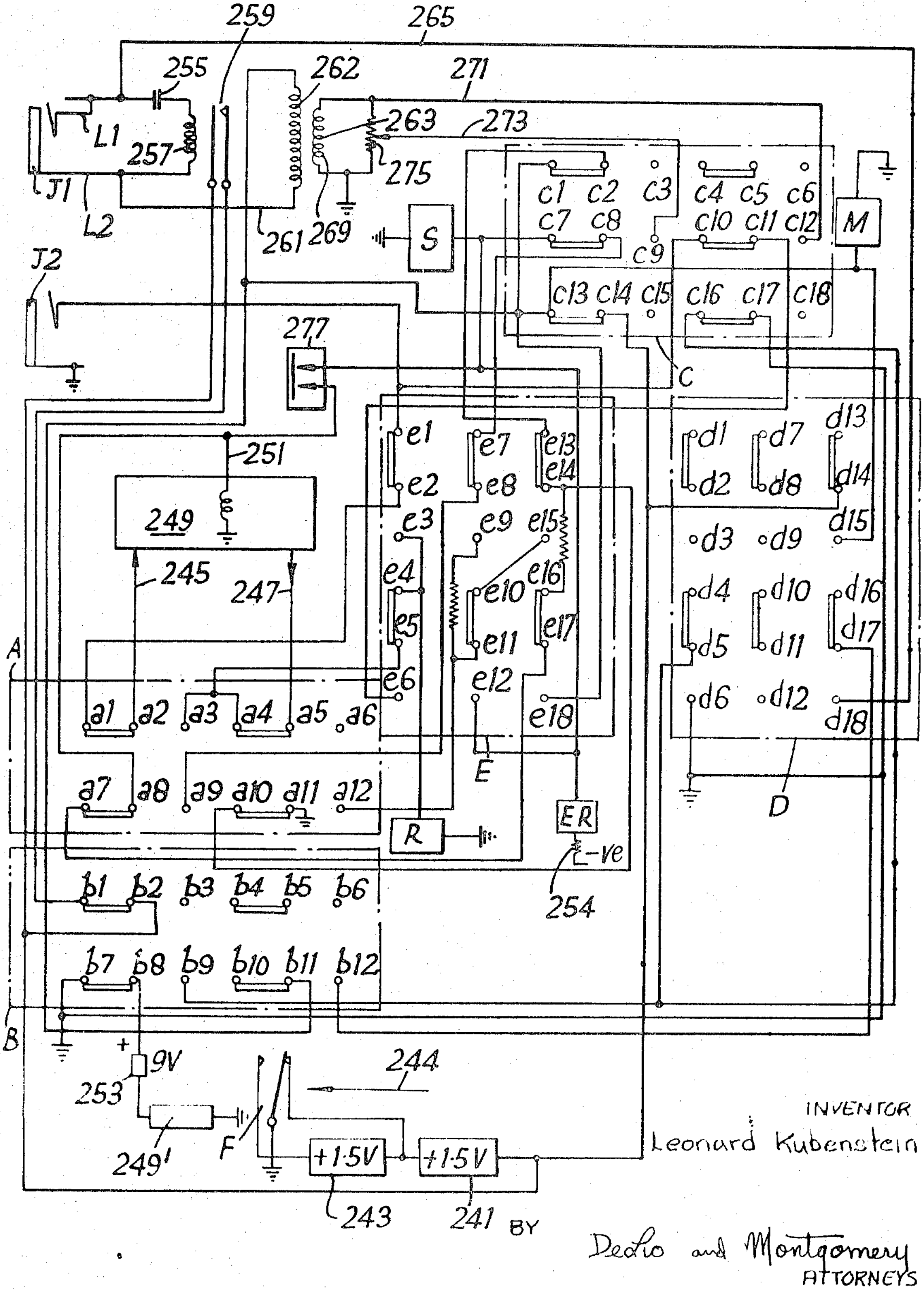
Figure 13:
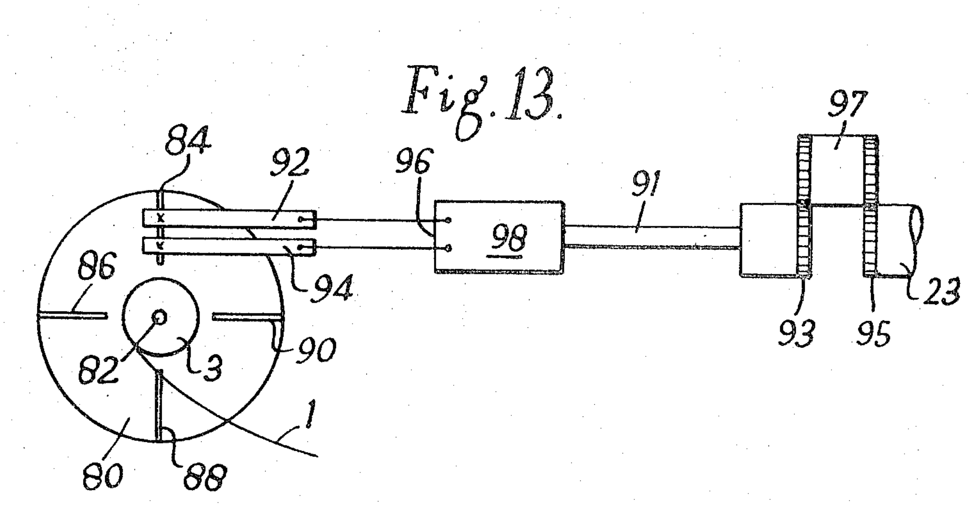
Figure 14:
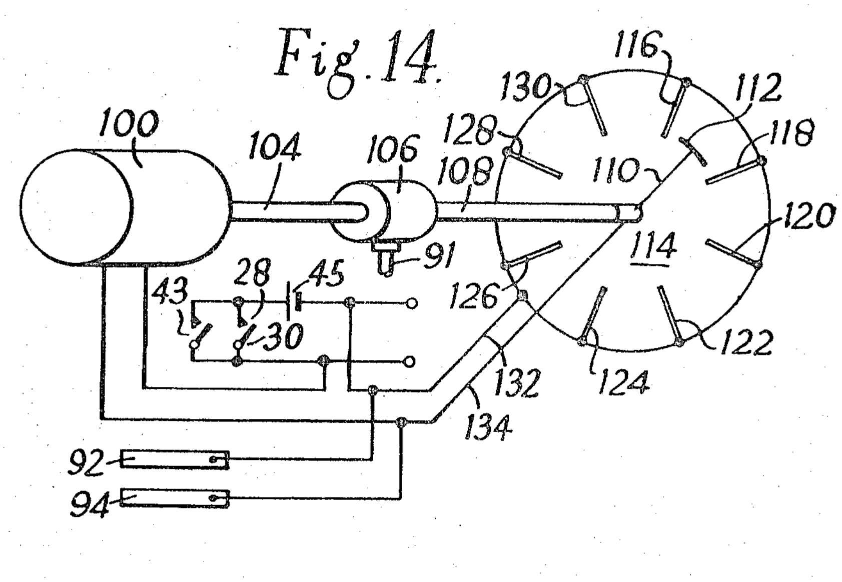
Figure 15:
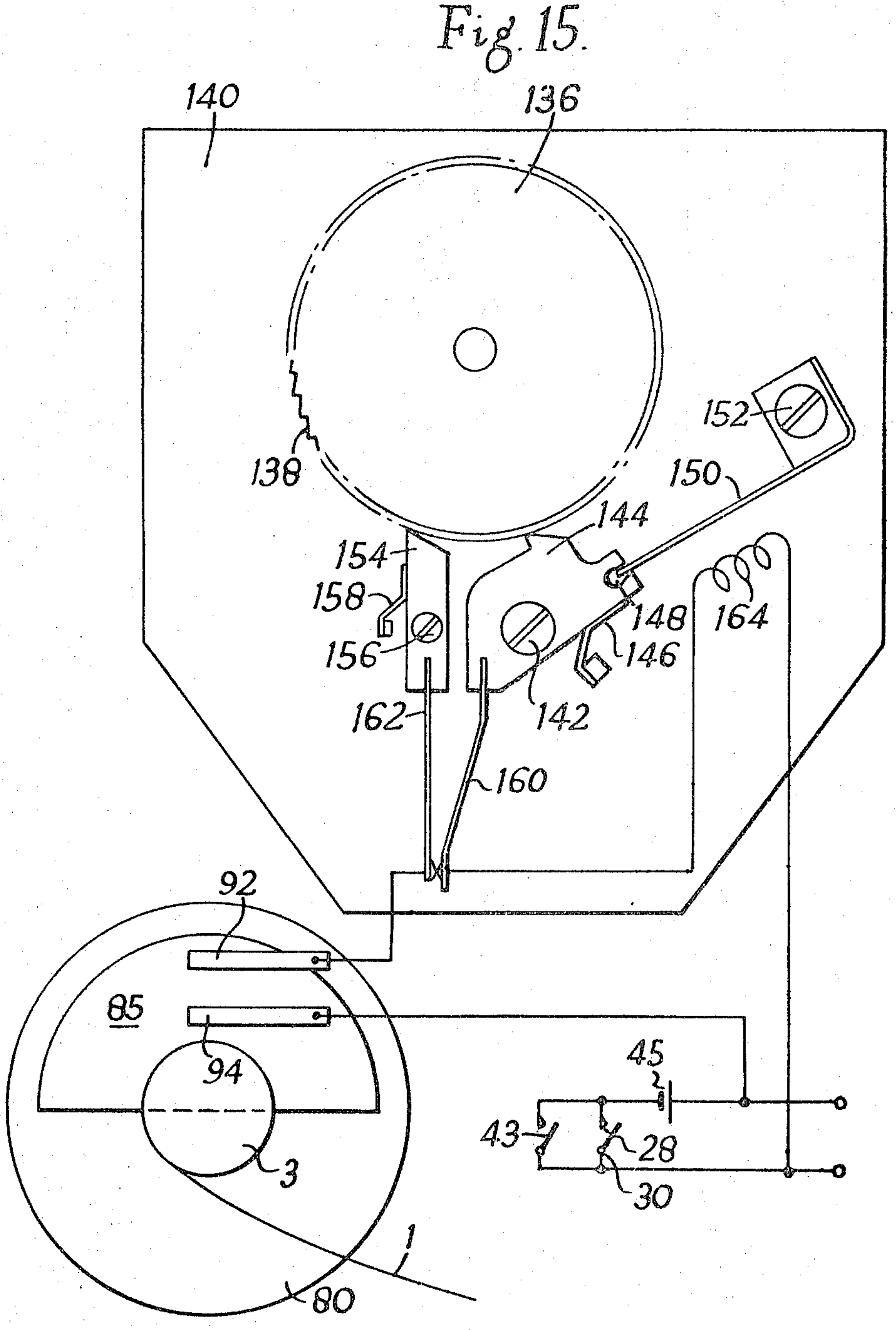

FIG. 3 shows diagrammatically a plan view of mechanical coupling means and a rotary switching element of the device shown in FIG. 2;

FIG. 4 is a diagrammatic section of the rotary element of FIG. 3;

FIGS. 5(*a*) and 5(*b*) show the rotary element of FIG. 3 in different angular positions;

FIG. 6 shows an alternative rotary element to that shown in FIGS. 2 to 5;

FIG. 7 is a part of an alternate electrical circuit to that shown in FIG. 2;

FIG. 8 shows diagrammatically a second telephone answering and recording device according to the invention;

FIGS. 9(*a*) and 9(*b*) show diagrammatically the operation of a switch in the device of FIG. 8;

FIGS. 10(*a*) and 10(*b*) show diagrammatically the operation of a second switch in the device of FIG. 8;

FIG. 11 is an electric circuit of the device of FIG. 8;

FIG. 12 is a side elevation of a modified part of the device of FIG. 8;

FIG. 13 shows diagrammatically an alternative form of coupling means of the device shown in FIG. 2;

FIG. 14 shows diagrammatically electromechanical transducer means, which form a part of the coupling means of FIG. 13; and FIG. 15 shows diagrammatically an alternative form for the electromechanical transducer means shown in FIG. 14.

Figure 1:
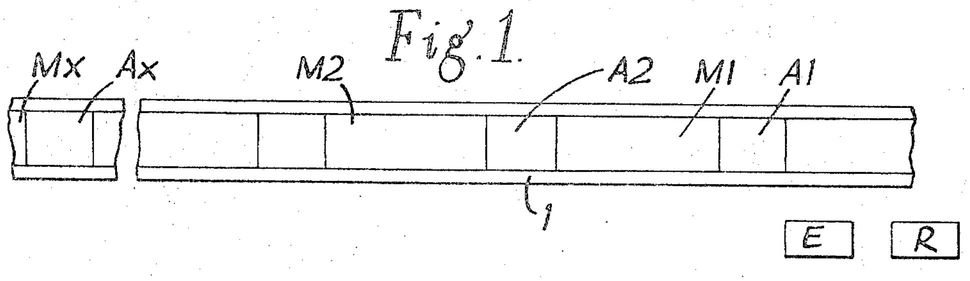
FIG. 1 shows a tape for use in a device according to the invention.

FIG. 1 of the drawings shows a strip of magnetic recording tape 1 for use in a device according to the invention. The tape 1 has a full recording track thereon, though it will be appreciated that other track configurations, such as half-track or multitrack configurations, can be used.

As indicated in FIG. 1, telephone answering announcements are recorded on sections A1, A2 . . . AX which are spaced apart lengthwise of the tape 1. Intermediate sections M1, M2 . . . MX are reserved for recording incoming messages. Usually each of the sections A1 . . . AX has the same announcement recorded thereon, and this is suitably a statement such as "This is an automatic telephone answering device, please leave a message when you hear the beep tone."

The tape shown in FIG. 1 is prepared by, and then used for telephone answering purposes by, the device shown in FIGS. 2 to 5 of the drawings.

To prepare the tape 1 the device shown in FIGS. 2 to 5 is operated in the manner of a tape recorder working in its "record" mode of operation, tape being driven past a playback and record head R whereby the announcements may be recorded on respective sections A1 . . . AX. A visual indication is provided when the leading edge of each section A1 . . . AX reaches the head, indicating that the operator must commence the recording. A further indication is given when the trailing edge of a section A1 . . . AX arrives at the head, indicating that recording must be completed. Suitably, one cycle of operation, the time between the arrival at the recording head of a leading edge of section A1 and the arrival of a leading edge of the succeeding section A2, takes 1 minute. Of this time, 20 seconds is taken up by the announcement A1 and 40 seconds is allowed for the message M1.

To use the tape for telephone answering purposes the device is connected to a telephone line and the tape is stored on a supply spool with a leader strip thereof secured to a take-up spool. An incoming ringing current then actuates a relay or semiconductor switch which causes a direct current path to be placed across the line and power to be supplied to various electrical circuits and electromechanical parts of the device. Initially the device is in its "playback" mode of operation so that the announcement on section A1 is fed to the telephone line as the section passes the recording and playback head. At the end of section A1 a "beep" tone is transmitted to the line and the device then switches itself to the "record" mode of operation so that the caller can record a message on intermediate section M1. Finally, at the end of section M1 the device is switched back to its "playback" mode, power is removed from the electrical circuits and electromechanical parts of the device, and the D.C. path is removed from the line. The device is then ready to receive a second incoming ringing current.

To play back messages recorded on M1 . . . MX the device is again operated as a tape recorded, this time switched to the "playback" mode of operation.

Referring now to FIG. 2 of the drawings, the device shown therein includes a supply spool 3 for the tape 1, a take-up spool 5, and a capstan 7 and co-operating pinch roller 9 for driving tape from the spool 3 to the spool 5. The capstan 7 is driven by an electric motor (not shown).

In travelling from the spool 3 to the spool 5 tape passes a playback and recording head R which is coupled by means of a switch 11 of relay 12 to the input 13 or the output 15 of an amplifier 17, according to the mode of operation of the device. Conductors L1 and L2 of a telephone line are likewise coupled to the input 13 or output 15 of the amplifier 17, depending upon the mode of operation of the device, via an input transformer 19 and the switch 11. Switch 11 is operated by means of a relay coil 21 of relay 12, current through the coil being controlled by a rotary element 23 of a switching means, as hereinafter described.

The rotary element 23 also controls flow of current through a winding 25 of a second relay 26 having a first pair of contacts 27 and 29 and a second pair of contacts 28 and 30, the functions of this relay being explained hereinafter. Finally, the element 23 controls operation of an oscillator 31, for sending "beep" tones to the line at predetermined intervals during a cycle of operations.

The rotary element 23 is driven from the supply spool 3 by coupling means 33, hereinafter described, the arrangement being such that the switching of the input 13 and output 15 of the amplifier 17 is synchronised with the passage of sections A1 . . . AX and M1 . . . MX of tape past the head R. A band 35 at one end of the element 23 provides a visual indication of the condition of the device at any time, i.e. whether it is in its "record" or "playback" mode of operation.

Referring again to FIG. 2, conductors L1 and L2 of the line are connected together by means of a series circuit consisting of a capacitor 37 and a winding 39 of a relay 41. Contacts 43 of the relay 41 are connected in series with a power supply 45 and an input to electrical circuits 47 which control the supply of power from the supply 45 to the amplifier 17 and the motor (not shown) for driving capstan 7. Electrical connections between the circuits 47 and the amplifier 17 and between the circuits and the motor are indicated diagrammatically in FIG. 2 by dotted lines 49 and 51, respectively.

Connected in parallel with the contacts 43 of the relay 41 are the fixed contact 30 and movable contact 28 of the relay 26 which, as mentioned above, is controlled by rotary element 23. The function of contacts 28 and 30 is explained hereinafter.

Conductor L1 of the line is also connected via a primary winding 53 of transformer 19 to the fixed contact 29 of relay 26 and conductor L2 is directly connected to the associated movable contact 27. Contacts 27 and 29 serve to place a direct current path across the line when connected together, as hereinafter described.

Finally, conductor L1 is connected via a capacitor 55 to an output of the oscillator 31 which, as mentioned above, supplies a beep tone to the line.

Secondary winding 57 of input transformer 19 has one end thereof connected to earth and its other end connected to fixed contacts 59 and 65 of the switch 11 which, as mentioned above, is used in switching the device between its "playback" and "record" modes of operation. Two further fixed contacts 61 and 63 of switch 11 are connected to the playback and record head R and the switch also has a first movable contact 67, associated with fixed contacts 59 and 61, and a second movable contact 69, associated with fixed contacts 63 and 65.

For supplying current to relay windings 21 and 25 and the oscillator 31 a power supply 71 has one pole thereof directly connected to each of the windings 21 and 25 and to the oscillator 31. To complete paths for current the oscillator 31, winding 25, power supply 71 and winding 21 are also connected to contacts 73, 75, 77 and 79, respectively, associated with rotary element 23.

Referring now to FIG. 3 of the drawings, the supply spool 3 is slidably engaged on one end of a rotatable spindle 81 and is secured thereto in a manner which prevents relative angular movement between the spool and the spindle by a pin 83 which extends through the spool 3 and is engaged in a disc 85 fixedly secured to the spindle. At its end remote from spool 3 the spindle 81 is coupled to the rotary element 23 by the coupling means 33 of FIG. 2.

As indicated in FIG. 3, the coupling means 33 include a worm gear 87 which is secured to the spindle 81 and meshes with a gear 89 on a transversely extending shaft 91. Shaft 91 carries a gear wheel 93 which is releasably coupled to a gear 95 on the rotary element 23 by means of an intermediate gear 97.

In its operative position, shown in FIG. 3, the intermediate gear 97 meshes with gears 93 and 95 so that rotation of the spindle 81 is accompanied by a rotation of rotary element 23. The intermediate gear 97 can, however, be withdrawn from engagement with gears 93 and 95 so that the spindle 81 can rotate independently of the rotary element 23, for purposes hereinafter explained. Coupled to the mounting for the gear 97 is an arm 98 which, as the gear is moved to its inoperative position, engages a cam 102 secured to rotary element 23. Engagement between the arm 98 and cam 102 causes the rotary element 23 to rotate to a predetermined angular position, as hereinafter explained.

Suitably the ratios of gears 87, 89, 93, 97 and 95 are so arranged that one complete revolution of the element 23 corresponds to one cycle of operation.

Referring now to FIGS. 3 and 4, the rotary element 23 includes a cylindrical member 99 which is rotatably mounted on a shaft 101 and a sheet of copper-clad laminate 103 which is folded round the member 99 and secured thereto by epoxy cement 105. The laminate 103 consists of glass fibre, Mylar or a flexible insulating material 107 having a thin film of copper 109 bonded thereto.

To form the rotary element 23 a printed circuit technique is used to etch the copper from selected areas of a flat sheet laminate 103, leaving the pattern of copper 109 shown in FIGS. 2 and 3. The etched laminate 103 is then folded round the cylindrical member 99 so that a joint 111 between a pair of opposed sides of the laminate extends parallel with the axis of the member, and the laminate and member are then immersed in boiling water for about 5 minutes. After cooling the laminate 103 retains its cylindrical form and is readily secured to the member 99 by cement 105.

Finally, the surface of the remaining areas of copper 109 are plated, first with nickel and then with gold, to form a hard contact surface.

Associated with the rotary element 23 are the four contacts 73 to 79, referred to above in connection with FIG. 2. Each of these contacts 73 to 79 is a resilient strip of metal which extends normal to the axis of the member 99 and has one end thereof engaging the curved surface thereof. As the element 23 rotates the contacts 73 to 79 ride over its surface and impart very little frictional resistance thereto. In this connection it will be appreciated that the thickness of the layer of copper 109 is exaggerated in FIG. 4 and in practice is only a few thousandths of an inch in thickness.

FIGS. 5(*a*) and 5(*b*) show the rotary element 23 at two positions during a complete revolution about its axis. In FIG. 5(*a*) the contacts 73 to 79 are all engaging an axially extending strip 113 of the insulating material 107 of the laminate 103. There is therefore no electrically conductive connection between any of the contacts 73 to 79 and no power is supplied from the power supply 71 to the relay windings 21 and 25 and the oscillator 31 of FIG. 2. FIG. 5(*b*) shows the rotary element 23 after rotation through a small angle in the direction indicated by arrow 115 from the position shown in FIG. 5(*a*). This rotation is sufficient to bring the area of copper 109 into engagement with contacts 75 and 77 providing an electrically conductive connection between these contacts and thereby allowing current to flow from the power supply to the winding 25 of relay 26.

Referring to FIGS. 2, 5(*a*) and 5(*b*), the band 35 at one end of rotary element 23 and a pointer 117 on a fixed support for the element enable an operator to ascertain the condition of the contacts 73 to 79 associated with the element 23. The band 35 is marked "S" at an angular location corresponding to the angular location of the strip 113 so that movement of "S" to a position adjacent the pointer 117 (as shown in FIG. 5(*a*)) indicates that there is no electrically conductive connection between the contacts. The windings 21 and 25 and the oscillator 31 are therefore deenergised.

A section 119 of the band 35 adjacent to the mark "S" is marked in red and is located at an angular position in which contacts 75 and 77 engage the copper area 109 but contacts 73 and 79 engage the insulating material 107. With the section 119 adjacent the pointer 117, as shown in FIG. 5(*b*), power is supplied to relay winding 25 via contacts 75 and 77.

Further rotation of the element from the position shown in FIG. 5(*b*), in the direction of the arrow 115, brings the copper area 109 into engagement with contact 79, and thereby causes power to be supplied to relay winding 21.

Contact 73 engages axially extending strips 121 of copper periodically during rotation of the element 23 to cause power to be supplied to the oscillator 31 for short intervals of time at predetermined parts of the cycle of operation.

In use of the device shown in FIGS. 2 to 5, the tape 1 of FIG. 1 must first be prepared by using the device as a tape recorder in its "record" mode of operation, as mentioned above. To this end the intermediate gear 97 is disengaged from gears 93 and 95 so that the arm 98 engages cam 102 and rotates the element 23 to the abovementioned predetermined angular position, which is a position wherein the mark "S" is adjacent to the pointer 117. The tape 1 is then arranged so that the trailing edge of the leader strip is adjacent the recording head R of the device, this rotation being effected independently of the supply spool 3. A microphone (not shown) is plugged in to the input 13 to amplifier 17 and recording head R is connected to the amplifier output 15.

The motor is then switched on and the capstan 7 drives tape from the supply spool 3 to the take-up spool 5, thereby causing rotation of the rotary element 23. The operator records an announcement whilst each of the sections A1 . . . AX is passing the head R, which condition is indicated by section 119 passing the pointer 117. At the end of this recording tape 1 is wound back on to the supply spool 3 until the trailing edge of the leader strip is again in a position adjacent the head R, indicated by the mark "S" on rotary element 23 being adjacent to the pointer 117.

The microphone is now disconnected and the head R connected to switch 11 in the manner shown in FIG. 2. The device is now plugged into the telephone line, as in FIG. 2, and is ready to receive incoming calls.

When a call is received the incoming ringing current intermittently energises relay winding 39 and causes contacts 43 to be connected together. At each connection of contacts 43 electric current flows from the power supply 45 to the electrical circuits 47, amplifier 17 and the motor (not shown). The capstan 7, and hence the tape 1, supply spool 3, and rotary element 23 are therefore driven intermittently. After several pulses of current the rotary element 23 has moved from the position shown in FIGS. 2 and 5(*a*) to the position shown in FIG. 5(*b*), in which contacts 75 and 77 are electrically connected together by copper area 109.

With contacts 75 and 77 electrically connected current flows from power supply 71 to the relay winding 25, which causes relay contacts 27 to engage contact 29 and contact 28 to engage contact 30. Engagement between contacts 27 and 29 causes a D.C. path to be connected between conductors L1 and L2, i.e. the call has been answered. Engagement of contact 28 with contact 30 ensures that current is supplied from power supply 45 to the motor and amplifier 17 irrespective of the condition of contents 41 and 43.

Operation of the motor causes the section A1 of tape 1 to be driven past the head R and the electrical signal picked up by the head is fed via contacts 69 and 63 of switch 11 to the input 13 of the amplifier 17. From the output 15 of the amplifier the signal is fed via contacts 67 and 59 of switch 11 to the secondary winding 57 of transformer 19, thereby generating a signal in primary winding 53 which travels along the conductors L1 and L2 of the line to the calling subscriber. The subscriber therefore hears the announcement recorded on A1.

When the rotary element 23 has rotated through an angular distance corresponding to the length of section 119, corresponding to the trailing edge of A1 reaching the head R, contact 73 temporarily engages a strip 121 of copper. Current is then supplied from power supply 71 to oscillator 31 and a "beep" tone is transmitted to the line, indicating to the caller that he can now record his message.

Immediately upon completion of the "beep" tone contact 79 is engaged by copper area 109 and current flows from power supply 71 to energise relay winding 21. This effects operation of switch 11 so that movable contact 69 engages contact 65, thereby coupling secondary winding 57 to the input 13 of amplifier 17, and movable contact 67 engages contact 61, thereby coupling the head R to the amplifier output 15. The device is then in its "record" mode of operation and an incoming signal travels via transformer 19 and amplifier 17 to the head R and is recorded on intermediate section M1 of tape 1. Shortly before the end of section M1 reaches the head R a second copper strip 121 engages the contact 73 and a further "beep" tone is transmitted to the line, indicating that the end of the recording period is approaching.

When rotary element 23 has returned to the position of FIGS. 2 and 5(*a*), where contacts 73 to 79 are all disengaged from windings 21 and 25. Contacts 27 and 29 are therefore opened, removing the D.C. path from the line, contacts 28 and 30 are opened to disconnect power supply 45 from electrical circuits 47, and switch 11 returns to the condition shown in FIG. 2. The device is then ready to receive a second incoming call.

To play back messages recorded on the intermediate sections M1 . . . MX of the tape, the device is operated as a tape recorder in its "playback" mode of operation. This involves rewinding the tape 1 on supply spool 3 until the trailing edge of the leader strip is again adjacent the head R, connecting the head R to the input 13 of the amplifier 17, and connecting a loudspeaker (not shown) to the amplifier output 15. The motor is then operated to drive the tape 1, past the head R and recorded messages are transmitted to the loudspeaker.

It will be appreciated that the mechanical load which is added to the mechanical system of the device by coupling the rotary element 23 to the supply spool 3 is very small in that there is a constant, small frictional resistance between contacts 73 to 79 and the element. Inclusion of the rotary element 23 has therefore a minimal effect upon the performance of the device in terms of wow, flutter and frequency response.

Coupling the rotary element 23 to the supply spool 3 or the take-up spool 5 ensures that sychronisation of the tape 1 and the angular position of the element 33, and hence synchronisation between the tape 1 and the electrical connections to the line L1 and L2, the amplifier 17 and the head R, is maintained even though slipping takes place between the capstan 7 and the tape. Synchronisation is also maintained if the tape is rewound on to the supply spool 3 by disconnecting the motor from the capstan 5 and connecting the motor to the supply spool 3.

In the above embodiment the rotary element 23 is coupled to the supply spool 3 since the torque on this spool due to the pull of the tape 1 is greater than the torque on the take-up spool 5. If the tape 1 is driven by a rim-drive applied to the take-up spool 5, however, the rotary element 23 is coupled to the take-up spool.

The rotary element 23 of the above embodiment can be replaced by a number of silver slip rings respectively engaged by contacts 73 to 79. In this case each slip ring has a part of its curved surface formed of insulating material for breaking the contact. The visual indicating device consisting of band 35 and pointer 117 can be replaced by a numerical counter, an analogue display, a lamp indicator or an audible warning tone having electrical contacts operated by the rotary element.

The device as shown in FIGS. 2 to 6 can be modified by connecting Zener diodes between the conductors L1 and L2, these diodes being connected "back to back" and serving to prevent inductive pulses of current from reaching the amplifier.

The erase head E of FIG. 1 and means for switching this erase head into and out of the circuit are not shown in FIG. 2. A relay can be arranged to switch erase head E in and out of the circuit during the "record" mode.

Relays 12 and 26 can be replaced by providing additional conductive areas on the rotary element 23 and constructing the contacts 27 to 30 and 59 to 69 in the form of resilient strips associated with one or other of these areas, as in the case of contacts 73 to 79. FIG. 6 shows a rotary element having a first copper area 123 and associated contacts 125, 127 and 129 and a second copper area 131 and associated contacts 133, 135 and 137. Similar copper areas can be provided for winding 25 and contacts 27 to 30.

Instead of employing the relay 41 to sense an incoming ringing current the above-described device can be modified on the lines shown in FIG. 7.

In this drawing a silicon controlled rectifier 141 has an anode 143 thereof connected to the positive pole of a power supply (not shown) and a cathode 145 thereof connected to a motor 147 for driving the capstan 7 and the amplifier 17. A negative pole of the power supply is also connected to the motor 147 and amplifier 17.

One end of a primary winding 149 of an input transformer 151 is connected directly to a conductor L2 of the line and the other end of the winding is connected to conductor L1 by means of a capacitor 153. An output voltage appearing in a secondary winding 155 of the transformer 151 is rectified by a diode 157 and the rectified voltage is applied to a gate 159 of the silicon controlled rectifier 141. Connected in parallel with the output of the secondary winding 155 is a limiting resistor 161, which serves to limit current across the gate 159 of the rectifier 141, Zener diodes 163 and 165 which limit surge voltages reaching the gate, and a larger capacitor 167 which acts as a low pass filter, favouring the ringing current over voice frequencies so that the input signal responds to an incoming ringing current.

An advantage of the device shown in FIGS. 2 to 5 and 6 and 7 of the drawings is that the rotary element 23 and the associated coupling means 33 and relays 12 and 26 can be incorporated in a tape recorder mechanism without substantially reducing the quality of the performance of the mechanism. The device can therefore be used not only for telephone answering purposes but also as an ordinary tape recorder for recording voices, music, etc. If a device is required primarily for telephone answering purposes a less expensive switching system, such as that shown in FIGS. 8 to 11 can be employed.

Referring now to FIGS. 8 to 11 the device shown in these drawings is intended for use primarily as a telephone answering and recording device. This device can be used for recording announcements A1 to AX to form the tape 1 shown in FIG. 1 and this tape can then be stored for use when the device is operating in its telephone answering mode.

Referring to FIG. 8 of the drawings, a tape 1 is stored on a supply spool (not shown) and is driven from this spool to a take-up spool 171 by driving means 173. In travelling from one spool to another the tape 1 passes a recording and playback head R (not shown in FIG. 8) and an erase head ER (not shown in FIG. 8) the arrangement being such that the tape is kept intimately in contact with the heads R and ER when the tape is driven in the forward direction.

As indicated in FIG. 8, the driving means 173 of the present device is a rim driving mechanism operating on the take-up spool 171, as opposed to the capstan drive employed in the device of FIGS. 1 to 7. Referring to FIG. 8, the take-up spool 171 and a drive wheel 175 are slidably engaged on one end of a rotatable shaft 177 which is journalled in bearings 179 and 181 at an opposed end thereof. The spool 171 and drive wheel 175 are normally rotatable relative to the shaft 177 but relative axial movement is prevented by spring clips 183. Drive wheel 175 has a rubber tyre 184 at the periphery thereof and this tyre is engaged by one end of an output shaft 185 of a motor M. The motor M is pivoted about an axis 189 and the output shaft 185 is maintained in engagement with the tyre 184 by means of a spring 191 which urges the motor in an anticlockwise direction about axis 189, as viewed in FIG. 8.

A disc 193 is fixedly secured to the shaft 177 at a location adjacent the drive wheel 175 and on the side thereof remote from the spool 171. The disc 193, and hence the shaft 177, can be rotated by the motor M by inserting one end of a pin 195, which extends through aligned apertures in spool 171 and drive wheel 175, in a blind aperture in the disc 193. Alternatively, the drive wheel 175 and the spool 171 can be rotated independently of the disc 193 and the shaft 177 by disengaging the pin 195 from the disc.

At a location intermediate bearings 179 and 181 the shaft 177 is coupled to a transversely extending shaft 197 by engagement of a wheel 199 on shaft 197 with a worm 201 on shaft 177. Shaft 197 is journalled in bearings 203 and 205.

The shaft 197 serves as a rotary element which performs similar switching and synchronising functions to those carried out by the rotary element 23 of FIGS. 2 to 7. Spool 171 normally rotates at one revolution per second and the usual period of an announcing and recording cycle is one minute, as mentioned above. Worm 201 has a ratio of 60:1 to wheel 199 so that the shaft 197 rotates once per minute, i.e. one revolution per complete cycle.

To perform its synchronising function the shaft 197 is formed with detents 207 and 209 at locations intermediate bearing 203 and wheel 199 and associated with these detents 207 and 209 are switches D and E respectively. As explained hereinafter in connection with FIG. 10, switch D is used to complete various electrical circuits at the beginning of a cycle of operation and to disconnect these circuits at the end of a cycle. Switch E is responsible for switching the device between the "playback" and "record" modes of operation.

Referring to FIGS. 9(*a*), 9(*b*) and 11, switch D is a slide switch consisting of six sets of contacts of which one set only is shown in FIGS. 9(*a*) and 9(*b*). Each set of contacts consists of three, aligned, fixed contacts, 1, 2 and 3 in FIGS. 9(*a*) and 9(*b*), and a sliding contact movable lengthwise of itself between positions in which the centre fixed contact 2 is electrically connected by the sliding contact to respective outer, fixed contacts 1 and 3. The six sliding contacts are electrically insulated from one another but are mechanically coupled to a cranked arm 211 which extends outwardly from a housing 213 of switch D towards the shaft 197.

One end of a tension spring 215 is secured to the arm 211 of switch D and the other end of the spring is secured to a fixed abutment 217 of the device. The spring 215 urges the arm 211 towards the shaft 197 so that an outer end of the arm bears against the detent 207 or a section of the shaft at the same axial location as the detent 207, according to the angular position of the shaft. The part of arm 211 which is engaged by the shaft 197 is long enough for the shaft to be rotated in either direction freely.

It will be noted from FIGS. 9(*a*) and 9(*b*) that the detent 207 is of limited angular extent, which means that the arm 211 engages the detent for a small fraction only of a complete revolution of the shaft 197. Further, the detent 207 extends only a short distance radially inwardly of the shaft 197, which means that movement of the arm 211 between positions wherein it engages the detent 207 and the shaft 197 itself involves only a limited lengthwise movement of the arm.

With the arm 211 engaging the shaft 197 rather than the detent 207, and therefore extending by a minimum amount from the switch housing 213, see FIG. 9(*b*), each sliding contact connects a centre fixed contact to the associated outer fixed contact which is to the left thereof, as seen in FIG. 9(*b*). Engagement between the arm 211 and the shaft 197 itself corresponds to the device being "switched-on" with the various electrical circuits thereon connected to their power supplies.

With the arm 211 engaging the detent 207, and therefore extending outwardly from the switch housing 213 by an increased amount, each sliding contact engages a centre fixed contact only, as seen in FIG. 9(*a*). This condition of the switch corresponds to the device being "switched-off."

It will be noted that the outer fixed contact of each set which is to the right in FIGS. 9(*a*) and 9(*b*) is not used.

Referring to FIGS. 10(*a*), 10(*b*) and 11, switch E is a slide switch of similar construction to switch D and likewise has six sets of contacts of which one set only is shown in FIGS. 10(*a*) and 10(*b*). Each set of contacts on switch E consists of three fixed contacts and one sliding contact. The sliding contacts of switch E are secured to an arm 219 which is urged towards the shaft by a tension spring.

It will be noted from FIGS. 10(*a*) and 10(*b*) that the detent 209 which is associated with switch E extends over approximately one third of the periphery of the shaft 197, which ensures that the device is in its "playback" mode, corresponding to engagement of the arm 219 with detent 209, for approximately one third of a cycle of operation. Further, the detent 209 extends radially inwardly of the shaft 197 by an amount sufficient to ensure that with the arm 219 engaging the detent 209 each sliding contact of contact of switch E engages a centre fixed contact and the associated outer fixed contact to the right thereof in FIGS. 10(*a*) and 10(*b*), whilst the arm 219 engaging the shaft 197 itself each sliding contact engages the centre fixed contact and an outer fixed contact to the left thereof.

Referring to FIG. 8, a visual indicator 221 is provided at the end of shaft 197 remote from switches D and E and serves to provide an indication of the angular position of the shaft 197, and hence of the mode of operation of the device, in similar manner to the indicator of FIGS. 2 to 7.

Indicator 221 includes a wheel 223 which is secured to the shaft 197 and has a coloured pattern imprinted on a peripheral part thereof. A section of the pattern is visible through an aperture 225 in a fixed, opaque mask 227 as the shaft 197 rotates.

In the pattern, a letter S serves to indicate the start of a cycle of operation. With letter S visible through the aperture 225 the detents 207 and 209 are so arranged that switch D is in the "off" position and switch E is at the start of its "playback" position, ready for answering an incoming call. By disengaging spool 171 and drive wheel 175 from the shaft 177, by removing pin 195, the spool is rotated to a position in which the trailing edge of the leader strip of the tape 1 is adjacent to the playback and recording head. Upon replacing the pin and operating the motor M to drive the tap past the head, the first announcement A1 will then be transmitted to the line.

During operation of the device the wheel 223 is rotated in the direction of the arrow of FIG. 8 so that an adjacent section 229 is visible through the aperture 225 after the letter S. Section 229 indicates that switch E is in a position corresponding to playback of an opening announcement, the decreasing width of the mark on this section indicating the decreasing amount of time remaining before the end of the announcement.

Finally, section 231 which appears in the aperture 225 after section 229, corresponds to the "record" mode of operation, i.e. the period when one of the sections of tape M1 . . . MX is travelling past the head.

When an operator is playing back a tape upon which incoming calls have been recorded he is aware from the pattern on wheel 223 when an opening announcement section A1 . . . AX is passing the recording and playback head. The device is provided with a motor speed control, described later with reference to FIG. 11, which enables the speed of travel of the tape to be increased when the announcements on sections A1 . . . AX are being played back.

FIG. 11 of the drawing shows the electrical circuits of the device of FIGS. 8 to 10.

In FIG. 11 there is shown a manually operated slide switch C of similar construction to switches D and E in that it includes six sets of contacts, each set consisting of three fixed contacts and a sliding contact. The fixed contacts of switch C are designated *c*1 to *c*18 in FIG. 11.

Switch C is used to switch the device from the "normal" mode of operation, in which the device is used as a tape recorder, or to record announcements on sections A1 . . . AX of the tape, to the "telephone answering" mode. In FIG. 11 the sliding contact of switch C are shown in the "normal" mode.

Switch D, as explained above, serves to switch the device "on" and "off" and is shown in FIG. 11 with its sliding contacts in the positions corresponding to the "off" condition. The fixed contacts of switch D are designated *d*1 to *d*18 in the drawing.

Switch E, as explained above is used to switch the device between the "record" and "playback" modes of operation. The fixed contacts of switch E are designated *e*1 to *e*18.

Associated with switch E is a slide switch A having four sets of contacts of which the fixed contacts are designated $a1$ to $a12$. Switch A is manually operated and serves to reverse the electrical connections to switch E. Thus, with switches A and C in the conditions shown in FIG. 11, switch E is in the "record" mode. If switch A is reversed, i.e. the sliding contacts are moved to the right from the position shown in FIG. 11, switch E is then in the "playback" mode.

A slide switch B is ganged to switch A and has fixed contacts $b1$ to $b12$.

In addition to the above switches, FIG. 11 of the drawings also shows the motor M of FIG. 8 and a main power supply 241 and additional power supply 243 for supplying current to motor M. Normally power supply 241 only is in circuit but power supply 243 can be switched in series therewith by means of switch F, operable by means of arm 244. This provides an increased flow of current to drive the motor M at a higher speed, as hereinafter described.

A playback and recording head R is coupled via switch E to an input 245 or to an output 247 of an amplifier 249, according to whether the device is operating in the "playback" or "record" mode. Amplifier 249 also has a second output 251 which is for supplying output voltages to a telephone line and a speaker S. Current for amplifier 249 is supplied from a power supply 253, the power circuit for the amplifier being designated 249 in FIG. 11.

An erase head ER has one terminal connected to the negative pole of power supply 253 via a resistor 254. The other terminal can be connected to the positive pole of power supply 253, earth potential, via switches C, E and A.

The device of FIG. 11 can be connected to a telephone line by means of a jack J1 which serves to connect a conductor L1 to one conductor of the line and a conductor L2 to the other conductor of the line.

Conductors L1 and L2 are connected in series with a capacitor 255 and a relay coil 257 having contacts 259 associated therewith. When connected together the contacts 259 serve to maintain current flow to the motor M, as hereinafter described.

Conductor L2 is also connected by means of a line 261 to one end of a primary winding 262 of a transformer 263. Conductor L1 is connected via a line 265 and switches D and B to the other end of the primary winding 262. A secondary winding 259 of transformer 263 has one terminal thereof connected to earth potential and the other terminal connected via a line 271 and switches C and E to input 245 of amplifier 249, when the device is being used to record an incoming signal from the line. When the device is used to transmit an announcement to the line the output 251 of amplifier 249 is fed via switches A, E and C and line 273 to a centre contact of a potentiometer 275. Potentiometer 275 serves to reduce the sensitivity of the device when used for transmitting messages to the line as compared with the sensitivity when, an incoming message is being received.

For recording announcements on sections A1 . . . AX of the tape a microphone can be plugged in to the device by means of a jack J2 and the output thereof transmitted to the input 245 of amplifier 249 via switch A.

An incoming message can be heard by means of a speaker S which can be switched into the circuit by a monitor switch 277.

The device of FIGS. 8 to 11 can be used as a simple tape recorder by removing the pin 195 so that rotation of the spool 171 is effected without causing any rotation of shaft 197. Switch C is moved to the condition shown in FIG. 11 and switches A and B are used to switch the device between the "playback" and "record" modes, the condition of A and B which leads to either mode of operation being determined by the condition of switch E.

To operate the device for telephone answering purposes it is first necessary to record announcements on sections A1 . . . AX of tape. The device is therefore set up in the manner described above with the trailing edge of the leader strip of tape 1 adjacent the playback and recording head R and the section S of the pattern on wheel 223 visible through the aperture 225. Switches A, B and C are in the conditions shown in FIG. 11.

A microphone is connected to jack J2, forming an electrical connection from earth, through the jack, and then via contacts $e1$ and $e2$ and contacts $a1$ and $a2$ to the input 245 of amplifier 249. From the output 247 of the amplifier 249 an output signal is then fed via contacts $a4$ and $a5$ and contacts $e4$ and $e5$ to the head R. Power for amplifier circuits 249' flows from power supply 253 via contacts $b7$ and $b8$.

The erase head ER, which is of the D.C. type, has one terminal thereof connected via resistor 250 to the negative pole of power supply 253, as explained above and its other terminal connected via contacts $c1$ and $c2$, contacts $e13$ and $e14$, and contacts $a10$ and all to ground. Messages previously recorded on the tape are therefore erased prior to the tape reaching the recording head R.

Current for driving the motor M in this mode of operation flows from ground to the positive pole of power supply 241 via the normally closed pair of contacts of switch F and then from the negative pole of power supply 241 via contacts $c14$ and $c13$ to the motor M, and thence to earth.

An announcement is recorded on section A1 as the section 229 of the pattern on wheel 223 is passing the aperture 225 in the mask 227.

To playback the announcements on sections A1 . . . AX of the tape 1, in order to make certain that these announcements have been recorded correctly, the tape is rewound on supply spool 171 until the trailing edge of the leader strip is adjacent the head R. Shaft 197 and wheel 223 remain in synchronism with the tape during this rewinding.

Switches A and B are now operated so that their slide contacts move to the right in FIG. 11. This leaves the circuit for supplying current to the motor unaffected but current for the amplifier power circuits 249' and power supply 253, and then via contacts $b8$ and $b9$ and contacts $c16$ and $c17$ to earth. The erase head ER is disconnected from the circuit since contacts $a10$ and all are open.

As the first section A1 of the tape 1 passes the head R the head is connected to the input 245 of amplifier 249 via contacts $e4$ and $e5$ and contacts $a2$ and $a3$. The amplifier output 251 is connected via contacts $a8$ and $a9$, contacts $e7$ and $e8$ and contacts $c7$ and $c8$ to the speaker S. The announcement on section A1 is therefore played back from the speaker.

When section M1 passes the head R, switch E is operated so that the slide contacts thereof move down from the positions shown in FIG. 11. The contacts $e4$ and $e5$ and $e7$ and $e8$ are therefore open so that the head R and speaker S are disconnected from the amplifier and the device is not "playing back" whilst section M1 passes the head.

To set the device for answering the telephone the tape 1 is rewound on to the supply spool 171 and again arranged so that the trailing edge of the leader strip is adjacent the head R. Shaft 197 remains in synchronism so that the mark S is visible through the aperture 225 in the mask 227.

The device is now plugged into a telephone line by means of the jack J1, switch C is switched from the "normal" condition to the "telephone" condition, thereby moving each slide contact to the right from the position shown in FIG. 11, and switches A and B are likewise switched to the right from the condition shown in FIG. 11. The device is now ready to respond to an incoming call.

When an incoming ringing current appears on conductors L1 and L2 the relay coil 257 is energised intermittently and contacts 259 closed. Current for motor M then flows via switch F from earth to the positive pole of power supply 241 and from the negative pole of 241 via closed contacts 259, contact *c*13 and the motor back to earth. Spool 171 an the shaft 197 are therefore rotated intermittently until the shaft has reached a position wherein the arm 211 of switch D is disengaged from the detent 207 and is forced inwardly of the switch housing 213. This causes the slide contacts of switch D to move downwards from the position shown in FIG. 11 and the switch is then in its "on" condition.

With switch D in its "on" condition there is a path for current from the negative pole of power supply 241 via contacts *d*14 and *d*15 to the motor M. The spool 171 and shaft 197 are therefore rotated continuously. In addition power is supplied to amplifier circuits 249' by a current flow from earth, through circuits 249', power supply 253, contacts *b*8 and *b*9 and contacts *d*5 and *d*6 to earth. Finally, the primary winding 262 of transformer 263 is connected between conductors L1 and L2 to provide a D.C. path across the line, one terminal of winding 262 being directly connected by line 261 to conductor L2 and the other terminal being connected to L1 via contacts *b*11 and *b*12, contacts *d*17 and *d*18 and line 265.

Switch E is still in the condition shown in FIG. 11, but with switches A, B and C switched to the right from the conditions shown in this figure this condition of switch E corresponds to a "playback" mode of operation. Thus, the announcement on section A1 of the tape 1 is fed from the head R to the amplifier input 245 via contacts *e*4 and *e*5 and contacts *a*2 and *a*3. The amplifier output 251 is connected to the line via contacts *a*8 and *a*9, contacts *e*7 and *e*8, contacts *c*8 and 9, the line 273, and potentiometer 275 to the transformer 269. The amplitude of the output signal can be varied by potentiometer 275.

The erase head ER is disconnected whilst A1 is passing the head R.

When the trailing edge of section A1 of the tape reaches the head R the arm 219 of switch E is disengaged from detent 209 and forced inwardly of the switch housing. This causes the slide contacts of switch E to move downwardly from the positions shown in FIG. 11. With switches A, B and C switched to the right from the conditions shown in FIG. 11, as mentioned above, this condition of switch E corresponds to the "record" mode of operation.

A signal generated by the voice of a distant subscriber is now fed to the amplifier input by the following path. Conductor L2 is connected by line 261 to one end of primary winding 262. Conductor L1 is connected to the other terminal of primary winding 262 via line 265, contacts *d*18 and *d*17 and contacts *b*12 and *b*11. The secondary winding 269 of transformer 263 is connected to the amplifier input 245 via contacts *c*12 and *c*11, contacts *e*6 and *e*5, and contacts *a*3 and *a*2. The resulting signal from the output 247 of the amplifier 249 is fed to the recording head R via contacts *a*5 and *a*6 and contacts *e*2 and *e*3.

An incoming message is therefore recorded on section M1 of the tape. The erase head ER is operative during this period since during this period contacts *e*11 and *e*12 and contacts *a*11 and *a*12 are connected.

When the trailing edge of section N1 reaches the head R the arm 219 of switch E engages the detent 209 and returns the switch to the conditions shown in FIG. 11, which is the "playback" condition as long as switches A, B and C are in the "telephone" condition. At the same time the arm 211 of switch D is engaged with detent 207 so that this switch is moved to the "off" condition shown in FIG. 11, disconnecting power from the motor M and the amplifier 249 and removing the D.C. path from the line.

The device is now in a condition wherein an incoming ringing current will cause the announcement on section A2 to be transmitted to the line.

When an incoming message is being recorded on sections M1 . . . MX of tape the message can be heard by pressing monitor switch 277 which connects speaker S to the output 251 of amplifier 249.

To play back messages recorded on M1 . . . MX the tape 1 is again rewound on the supply spool 171 and arranged with the trailing edge of its leader strip adjacent to the head R. The device is left in the "telephone" condition, i.e. with the sliding contacts of the switch C moved to the right from the positions shown in FIG. 11. Switches A and B are switched back to the condition shown in FIG. 11.

With switches A, B and C in these conditions current flows from the negative pole of power supply 241 to the motor M via contacts *b*2 and *b*1 and contact *c*12, irrespective of the condition of switches D and E. Current for amplifier power circuits 249' flows via contacts *b*7 and *b*8.

As the section A1 passes the head R the switch E is in the condition shown in FIG. 11, the speaker S is disconnected from the amplifier 249 as the contacts *c*7 and *c*8 are open, and the erase head ER is disconnected since contacts *c*1 and *c*2 and *e*11 and *e*12 are open. The microphone jack J2 is connected to the input 245 of amplifier 249 but since there is no microphone in use there is no input to the amplifier. The head R is connected to the amplifier output 247 via contacts *e*4 and *e*5 and *a*4 and *a*5.

When section M1 reaches the head the sliding contacts of switch E are moved down from the positions shown in FIG. 11. Head R is now connected to the amplifier input 245 via contacts *e*3 and *e*2 and contacts *a*1 and *a*2. The speaker S is connected to the amplifier output 251 via contacts *e*18 and *e*17 and contacts *a*7 and *a*8. The message on M1 is therefore broadcast from the speaker S. During this "playback" operation the erase head ER is disconnected from the circuit as contacts *c*1 and *c*2 are open and contacts *a*11 and *a*12 are open.

When sections A1 . . . AX are passing the head during the "playback" operation, as indicated by section 229 of which 223 passing the aperture 225, the speed of motor M can be increased to avoid wasting time. To do so the arm 244 is moved to the left from the position shown in FIG. 11, moving the movable contact of switch F into engagement with the left-hand fixed contact and thereby connecting additional power supply 243 in series with power supply 241.

To simplify the controls for a user when the device is being operated as a tape recorder only the device shown in FIGS. 8 to 11 can be modified in accordance with FIG. 12. This enables the switch C to be releasably connected to wheel 199 and shaft 197 and the pin 195 to be dispensed with.

Referring to FIG. 12, a wheel 199' of the modified device is mounted on the shaft 197' in a manner which allows rotation of the wheel independently of the shaft. Axial movement of the wheel 199' on the shaft 197' is restricted by collars 281 secured to the shaft.

One side of wheel 199' is formed with a ring of teeth 283 and is faced by a corresponding ring of teeth 285 on a collar 287 having keys 289 which engage in keyways 291 on the shaft 197'. The collar 287 is therefore connected to the shaft 197' in a manner which prevents relative rotation between the shaft and the collar but allows limited, relative axial movement.

The collar 287 is mechanically coupled to a control knob (not shown) for operating switch C, the coupling being such that with C in the "normal" condition the collar 287 is disengaged from the wheel 199' and the wheel, and hence spool 171, rotates independently of the shaft 197' whilst movement of switch C to the "telephone" condition causes collar 287 to engage wheel 199' and results in shaft 197' rotating with the spool 171.

The teeth 283 and 285 can be replaced by clutch plates. A separate switch, ganged to switch A, can be connected to erase head ER so that the erase head is energised in the "record" mode of operation when the opening announcements are being recorded on sections Al . . . AX.

Relay winding 257 and contacts 259 can be replaced by a silicon controlled rectifier switch, as described above for FIGS. 2 to 7.

Referring to FIGS. 9 and 11, the power supply to the motor M and various electrical circuits of the device is disconnected when the sliding contact of each set of contacts in switch D contacts the centre fixed contact of the set but just fails to contact an outer fixed contact. The clearance between the sliding contact and an outer fixed contact depends upon the shape of detent 207, the relationship between the detent 207 and cooperating part of the arm 211, and the relative spacing between the fixed contacts.

If the motor M is a low-torque battery operate motor, shaft 197 stops rotating immediately power supply 241 is disconnected from the motor. If the distance between the relevant slide contact and outer fixed contact switch D is small, arcing may then take place between these two contacts.

The distance between the slide contacts and the associated fixed contacts can be increased by arranging two additional relay contacts close to the shaft 197 of FIG. 8 and arranging for these contacts to be operated by a cam provided on the shaft. The additional relay contacts are connected in parallel with two fixed contacts of switch D, in series with the motor M and its power supply 241. The cam is arranged to break the additional contacts to open the motor circuit only after all contacts of switch D have been opened. The motor M is therefore driven until all the contacts on switch D have been opened, and arcing is avoided.

To transmit a beep tone to the line a second cam is provided on the shaft and associated with this cam are a pair of contacts which are connected in series with an oscillatory circuit.

The second cam is arranged to close the associated contacts so that oscillations are transmitted to the line at the end of an announcement on each section Al . . . AX and again just before the end of the period within which one of sections Ml . . . MX is passing the head.

For simplicity, it is not necessary to provide a separate oscillator. Instead, the contacts associated with the second cam can be used to connect a capacitor between the input and output of amplifier 249, causing the amplifier to oscillate at about 15 kc./s.

In FIGS. 13 and 14 of the drawings there is shown an alternative form of coupling means 33 for the device shown in FIGS. 2 to 5. Referring to FIG. 13, the coupling means 33 include a disc 80 which is keyed to a shaft 82 supporting the supply spool 3 and is therefore rotated in unison with the spool upon operation of the driving means 7, 9. One surface of the disc 80 is formed of insulating material and provided on this surface are four electrically conductive elements 84, 86, 88 and 90. The elements 84 to 90 are equiangularly spaced about the axis of shaft 82 and each extends in a radial direction relative to the disc 80.

Associated with the disc 80 are two electrical contacts 92 and 94 which are connected to an input 96 of electromechanical transducer means 98. Contacts 92 and 94 are biased into engagement with the surface of the disc 80 and upon rotation thereof the contacts are successively short-circuited by the elements 84 to 90 on the disc. The transducer means 98 has an output shaft 91 which corresponds to shaft 91 of FIG. 3 and carries a gear wheel 93 releasably coupled to a gear 95 on the rotary element 23 by means of an intermediate gear 97.

Referring to FIG. 14 of the drawings, the transducer means 98 includes an electric motor 100 having a winding (not shown) connected in series with the power supply 45 and the parallel circuit consisting of contacts 43 and contacts 28 and 30 (see FIG. 2) and with the two electrical contacts 92 and 94 of FIG. 13. When contacts 43 or contacts 28 and 30 are closed, short-circuiting of the contacts 92 and 94 by one of the elements 84 to 90 on the disc 80 therefore causes a pulse of current to be applied to the motor winding, as hereinafter described.

The motor 100 has an output shaft 104 coupled via a reduction gear 106 to the above-mentioned output shaft 91 and to a second shaft 108. An arm 110 is provided at one end of the shaft 108 and mounted on this arm, but electrically insulated from the shaft, is a wiper 112 of electrically conductive material.

Associated with the wiper 112 is a disc 114 of insulating material which is mounted in a fixed position coaxially of the shaft 108. Eight conductive elements 116 to 130 are provided at equiangularly spaced locations on one surface of the disc 114, each element extending radially inwardly from the periphery of the disc to a location approximately midway between the periphery and the axis of the disc. The disc 114 is arranged so that the wiper 112 engages the surface thereof at a radial location wherein the angular spacing between the adjacent elements 116 to 130 is slightly greater than the length of the wiper. Accordingly the wiper 112 serves as a "nonshorting" contact, i.e. it can rest between an adjacent pair of the elements 116 to 130 without short-circuiting them.

The elements 116 to 130 on the disc 114 are electrically connected by means of a common lead 132 to one pole of the power supply 45 and to the contact 92. The wiper 112 is electrically connected by means of a lead 134 to the contact 94.

Operation of the device shown in FIGS. 2 to 5 when modified by the inclusion of coupling means of the form shown in FIGS. 13 and 14 takes place in the manner described above, except as follows.

As the tape 1 is driven from the supply spool 3 to the take-up spool 5 the spool 3, shaft 82 and the disc 80 are rotated and the contacts 92 and 94 are short-circuited four times per revolution of the spool and disc by the elements 84 to 90. Since contacts 28 and 30 are closed a pulse of current is supplied from the power supply 45 to the winding of motor 100 four times per revolution of the disc 80.

Each pulse of current supplied to the motor winding causes rotation of the output shaft 104 of the motor and a corresponding rotation of the shaft 91 and the second shaft 108. Rotation of the shaft 91 causes rotation of rotary element 23. Rotation of the second shaft 108 causes rotation of the wiper 112 in a clockwise direction from the position shown in FIG. 4 towards the element 118 on the disc 114, and the duration of each pulse is such that the wiper 112 engages the element 118 before the pulse is cut-off by disengagement of one of the elements 84 to 90 from the contacts 92 and 94.

When this disengagement has taken place and the contacts 92 and 94 are open-circuited, current is still supplied from the power supply 45 to the motor winding via lead 132, element 118, wiper 112, arm 110, and lead 134. This current is maintained until the shaft 108 has rotated by an amount sufficient to cause wiper 112 to disengage from the element 118, whereupon the current is cut-off and rotation of shafts 91, 104 and 108 of the rotary element 23 ceases.

Each succeeding pulse of current caused by the elements 84 to 90 on disc 80 short-circuiting the contacts 92 and 94 likewise causes a small rotation of the shafts 91, 104 and 108 and rotary element 23. The frequency at which the succeeding rotation of the element 23 take place is, of course, equal to the frequency of the current pulses from the supply 102, which is determined by the speed of rotation of disc 80 and spool 3. On the other hand, the angle through which element 23 rotates during each small rotation thereof is determined by the time for which rotation of the wiper 112 is maintained, which depends on the dimensions of the wiper, the angular spacing of adjacent pairs elements 116 to 130, etc. and is greater than the duration of each current pulse.

It will be noted that the circuit consisting of power supply 45, contacts 43 and contacts 28 and 30 supplies current for the series circuit consisting of the winding of motor 100 and contacts 92 and 94 and for the electrical circuits 47, which control the driving means for capstan 7. This means that whenever contacts 43 and contacts 28 and 30 are open there is no current supplied to the driving means for capstan 7 or to the winding of motor 100. Accordingly, even if rotation of capstan 7 is terminated with the spool 3 and disc 80 in angular positions wherein contacts 92 and 94 are short-circuited by one of the elements 84 to 90, the motor 100 is not energised. The wiper 112 is not therefore further rotated to initiate another switching cycle.

A further device according to the present invention also employs a tape as shown in FIG. 1 of the drawings and includes an electrical circuit as shown in FIG. 2. Further, the coupling means 33 of this electrical circuit correspond to the coupling means shown in FIG. 13, except for a change in the form of electrically conductive element on disc 80. In this further device, however, the electromechanical transducer means 98 of the coupling means 33 are as shown in FIG. 15 of the drawings.

Referring to FIG. 15, the disc 80 of the second device is provided with a single electrically conductive element 85 which is semicircular in shape and is arranged to short-circuit the associated contacts 92 and 94 during one half of each revolution of the spool 3 and disc 80.

As also indicated in FIG. 15, the electromechanical transducer means 98 include a ratchet wheel 136 which has a large number of teeth 138 and is rotatably mounted on a base plate 140. The ratchet wheel 136 is mechanically coupled to the shaft 91 of FIG. 13 by coupling means not shown in FIG. 15.

Mounted on the base plate 140 by means of a pivot 142 is a first pawl 144 which is biassed by means of a leaf spring 146 into contact with the teeth 138 of the ratchet wheel 136. The pawl 144 is preferably capable of some limited movement relative to the pivot 142 and is formed with a slot 148 for co-operating with one end of a bimetallic strip 150, the opposite end of which is secured to a post 152 carried on the base plate 140. A second pawl 154 is mounted on the base plate 140 by means of a pivot 156 and is biassed by means of a leaf spring 158 into engagement with the teeth of the ratchet wheel 136.

Carried on the pawls 144 and 154 are contacts 160 and 162 of a pair of contacts which are insulated from their respective pawls.

Contact 162 is connected to the contact 92 associated with disc 80. Contact 160 is connected to one terminal of a heater coil 164 for the bimetallic strip 150 and the other terminal of the coil is connected to the contact 94 via the parallel circuit consisting of contacts 43 and contacts 28 and 30 and the power supply 45.

The operation of this further device according to the invention corresponds to the operation of the device illustrated in FIGS. 13 and 14 except for the following. In the further device short circuiting of the contacts 92 and 94 by the electrically conductive element 85 on disc 80 causes a pulse of current to flow from the power supply 45 through the heater coil 164, the closed contacts 160 and 162, and closed contacts 43 or 28 and 30. The pulse of current supplies sufficient power and is of sufficient duration to heat the bimetallic strip 150 to a predetermined temperature above ambient temperature and the strip is deflected in a manner which causes the pawl 144 to be urged in an anticlockwise direction about the pivot 142. This deflection causes the pawl 144 to engage the teeth 138 and drive the ratchet wheel 136 through an angle substantially equal to the angle subtended at the centre of the wheel by one of the teeth 138. Rotation of ratchet wheel 136 causes rotation of shaft 91 and rotary element 23 coupled thereto.

During the driving of the wheel 136 both pawls 144 and 154 rotate in an inticlockwise sense, as seen in FIG. 5, and the contacts 160 and 162 remain closed. At the end of the movement of the wheel 136, however, the pawl 154 moves into engagement with the tooth subsequent to that which it is engaged prior to driving of the wheel. When the pawl 154 drops into the next succeeding tooth a clockwise rotation of the pawl takes place which is sufficient to break the contacts 160 and 162.

With the contacts 160 and 162 broken the flow of current from the power supply 45 to the coil 164 is cut off and the bimetallic strip 150 cools. As the strip 150 cools the pawl 144 is moved in a clockwise sense until the pawl is freed from the associated tooth 138, at which time the biassing spring 146 urges the pawl 144 into contact with the succeeding tooth. The movement of the pawl 144 into engagement with the next succeeding tooth effects slight rotation of the pawl 144, which causes reengagement of contacts 160 and 162.

It will be appreciated that the magnitude and duration of the power supplied to the coil 164 from the power supply 45 must be sufficient to heat the bimetallic strip 150 to the above-mentioned predetermined temperature at which the ratchet wheel 136 is rotated through an angle equal to the angle subtended at the centre thereof by one of the teeth 138. It is to ensure an adequate duration for the current pulse supplied from the power supply 45 that the disc 80 of the present device is provided with an electrically conductive element 85 of the form shown in FIG. 15. As is clear from this figure, the element 85 closes the contacts 92 and 94 for one half of the period of each revolution of the disc 80 and spool 3.

During repetitions of the sequence of operations described above, the total time taken for the strip 150 to heat from ambient temperature to the predetermined temperature and rotate the wheel 136 through an angle sufficient to cause contacts 160 and 162 to be broken is constant, and this time is shorter than the time for which contacts 92 and 94 are closed by the element 85 on disc 80. The end of the current pulse from the power supply 45 is therefore determined by the opening of contacts 160 and 162. During the time that the strip 150 is cooling down to ambient temperature, and before the contacts 160 and 162 are closed again, the contacts 92 and 94 are opened by disengagement therefrom of the element 85 on the disc 80. There is therefore no further current pulse to heat up the strip 150 until the element 85 on disc 80 again closes the contacts 92 and 94.

It will be appreciated from the above that each time the element 85 closes contacts 92 and 94 the ratchet wheel 136, and hence the rotary element 23, is rotated through a predetermined angle. The frequency at which these rotations take place is determined by the speed of rotation of spool 3. On the other hand, the angle through which the element 23 rotates during each small rotation thereof depends upon the construction of the ratchet wheel 136, in particular upon the angle subtended at the centre thereof by one of its teeth.

It will be appreciated that coupling means of the form shown in FIGS. 13 and 14 or FIGS. 13 and 15, above, can be used in the telephone answering device shown in FIGS. 8 to 11. In this event the above-described coupling means are used to couple the take-up spool 171 to the rotary element, shaft 197, of the device.

I claim:

1. A telephone answering and recording device for operation with a magnetic tape having answering announcements recorded on sections thereof which are spaced lengthwise of the tape, comprising means for rotatably mounting supply and take-up spools for the tape, means for driving tape from the supply spool to the take-up spool, a recording and playback head arranged at a predetermined location on the path of tape between the spools, amplifier means, means for detecting an incoming ringing current on a telephone line and, upon detection, causing operation of the driving means, switching means including at least one pair of electrical contacts for alternately connecting the amplifier between the head and the line for recording and for reproduction, and means coupling the switching means to one of the spools so that rotation of the spool when the driving means are energized and tape is driven from the supply spool to the take-up spool causes the switching means to effect a predetermined sequence of switching operations in synchronism with the rotation of the spool and the movement of the tape, the said switching operations serving to ensure that an amplifier input is coupled to the head and an amplifier output is coupled to the line whilst a section of tape bearing an answering announcement is passing the head and that these couplings are reversed when a section of tape intermediate the recorded announcements is passing the head and means coupled to said switching means for identifying the connection condition of said switching means.

2. A telephone answering and recording device as claimed in claim 1 wherein the switching means comprise a switching shaft which is formed with cam means and an electrically conductive contact member which is movable lengthwise thereof by the cam means upon rotation of the switching shaft, the said contact member being movable between a position wherein the member forms an electrical connection between a pair of contacts and a position wherein the contacts are electrically insulated from one another.

3. A telephone answering and recording device as claimed in claim 1, wherein the driving means include a capstan and a cooperating pressure roller which engage the tape at a location on the path intermediate the spools.

4. A telephone answering and recording device as claimed in claim 1, wherein means are provided for transmitting a predetermined signal to the telephone line, and the switching means are adapted to effect operation of the transmitting means at or near the beginning of a period wherein an intermediate section of the tape is passing the head.

5. A telephone answering and recording device as claimed in claim 1, wherein the driving means include a driving element which is coupled to the take-up or supply spool and, in operation, effects rotation thereof to drive tape from the supply to the take-up spool.

6. A telephone answering and recording device as claimed in claim 5, wherein the driving means are coupled to the take-up spool.

7. The device of claim 1 wherein said means for identifying provides a visual indication.

8. The device of claim 7 wherein said means for identifying comprises a rotatable wheel having markings thereon indicative of said connection conditions.

9. A telephone answering and recording device as claimed in claim 1, wherein the switching means include a rotary element and said at least one pair of electrical contacts associated with the element, and the coupling means include means for generating an electrical signal whose magnitude varies with the angular position of the said one of the spools, electromechanical transducer means having an output thereof coupled to the rotary element, and means for supplying the electrical signal to the input of the transducer means whereby the transducer means serve to rotate the rotary element to vary the electrical connections between the contacts in accordance with the rotation of the said one of the spools.

10. A telephone answering device as claimed in claim 9, wherein the electrical signal generated by the generating means comprises a train of pulses of current, there being a predetermined number of pulses generated during each revolution of the said one of the spools, and the transducer means are adapted to rotate the rotary element through a predetermined angle each time a pulse is applied to the input thereof.

11. A telephone answering device as claimed in claim 10, wherein the transducer means includes means adapted, upon the supply of a pulse to the input of the transducer means, to cause continued rotation of the rotary element for a period longer than the duration of the pulse, at the end of which period the rotary element has been rotated through the said predetermined angle.

12. A telephone answering device as claimed in claim 11, wherein the electromechanical transducer means include an electric motor having an output shaft thereof coupled to a rotatable electrical contact, at least one fixed contact associated with the rotatable contact, and a source of electrical current connected in series with the winding of the motor, the rotatable contact and the or each contact, and the electrical signal is applied to a winding of the motor, whereby during supply of the signal to the winding the output shaft of the motor is rotated by an amount sufficient for electrical connection to be made between the rotatable contact and the, or one of the, fixed contacts, and current is then supplied from the said source to the winding until the rotatable contact has been rotated through an angle sufficient to break the electrical connection between the rotatable contact and the fixed contact.

13. A telephone answering device as claimed in claim 12, wherein the electromechanical transducer means include a disc of insulating material, and a plurality of the said fixed contacts secured to the disc at equiangularly spaced locations at or near the periphery thereof and electrically connected to a common electrical lead, and the rotatable contact is adapted to successively engage the fixed contacts during rotation thereof.

14. A telephone answering device as claimed in claim 10, wherein the electromechanical transducer means include means adapted, upon the supply of a pulse to the input of the transducer means, to discontinue rotation of the rotary element after a period which is shorter than the duration of the pulse, at the end of which period the rotary element has been rotated through the said predetermined angle.

15. A telephone answering device as claimed in claim 14, wherein the electromechanical transducer means include thermally sensitive deflectable means, a heater coil associated with the deflectable means, means for applying the pulses to the coil, whereby the deflectable means are heated and deflected from an initial position thereof, means adapted, upon deflection of the deflectable means, to effect rotation of the rotary element through the predetermined angle, and means adapted, after deflection of the element through the said angle, to disconnect the supply means for the current pulses from the coil, whereby the deflectable means are allowed to cool and return to the said initial position.

16. A telephone answering device as claimed in claim 15, wherein the electromechanical transducer means include a rotatably mounted ratchet wheel which is coupled to the rotary element, and first and second pawls spring-biassed towards engagement with teeth of the ratchet wheel, the deflectable means are adapted upon a predetermined change in temperature thereof to cause the first pawl to drive the wheel through an angle of at least one tooth, the second pawl is rotated through the said angle by a tooth of the ratchet wheel and is then biassed into engagement with the succeeding tooth, and electrical contacts are secured relative to respective pawls and are connected in series with the heater coil, the contacts being electrically connected together when the deflectable means are in the initial position and during deflection thereof and being disconnected from one another when the second pawl is biassed into engagement with the succeeding tooth.

17. A telephone answering device as claimed in claim 16, wherein the thermally sensitive deflectable means comprises a bimetallic strip.

18. A telephone answering device as claimed in claim 10, wherein the means for generating an electrical signal comprise a rotatably mounted disc coupled to the spool for rotation therewith, a plurality of electrically conductive elements mounted at angularly spaced locations on an insulating surface of the disc, a pair of fixed, electrical contacts so arranged that upon rotation of the disc the electrically conductive elements sequentially connect together the contacts, and a source of electrical current connected in series with the contacts, whereby a pulse of current flows from the source whilst the contacts are connected together.

19. A telephone answering and recording device as claimed in claim 1, wherein the switching means include a rotary element and the said pair of electrical contacts are associated with the element and the said coupling means couple the element to the said one of the spools in such manner that rotation of the spool causes rotation of the rotary element to vary the electrical connections between the contacts and thereby to effect the predetermined sequence of switching operations.

20. A telephone answering and recording device as claimed in claim 19, wherein the switching means include a relay winding and power supply means which are connected in series with the said electrical contacts, whereby the winding is energised when the rotary element causes the contacts to be electrically connected together and relay contacts associated with the winding then serve to effect the said coupling of the amplifier input and output to the head and line, respectively, and the said reversal of these couplings.

21. A telephone answering and recording device as cliamed in claim 19, wherein the rotary element is a cylindrical element rotatable about the axis thereof and having predetermined areas of its cylindrical surface respectively formed of electrically conductive and non-conductive material, and the electrical contacts engage the cylindrical surface, a pair of contacts being electrically connected together when both engage an area of conductive material and electrically insulated from one another when one or both engage an area of electrically nonconductive material.

22. A telephone answering and recording device as claimed in claim 21, wherein the rotary element is formed from a laminate of an electrically conductive sheet and an electrically nonconductive sheet, the laminate then being folded into the form of a hollow cylinder with the conductive sheet radially outwardly of the nonconductive sheet and parts of the conductive sheet being removed to expose parts of the nonconductive sheet.

23. A telephone answering and recording device as claimed in claim 19, wherein the rotary element is releasably coupled to the said one of the spools, whereby the element can be disengaged from the spool to allow rotation of the spool independently of the element for synchronisation purposes.

24. A telephone answering and recording device as claimed in claim 23, comprising means adapted, when the element is decoupled from the said one of the spools, to rotate the element to a predetermined initial position.

25. A telephone answering and recording device for operation with a magnetic tape having answering announcements recorded on sections thereof which are spaced lengthwise of the tape, the sections between the announcements adapted to record incoming messages comprising, means for rotatably mounting supply and take-up spools for the tape, means for driving tape from the supply spool to the take-up spool and rewinding the tape to the supply spool, a recording and playback head arranged at a predetermined location on the path of tape between the spools, amplifier means, means for detecting an incoming ringing current on a telephone line and, upon detection, causing operation of the driving means, switching means for connecting the amplifier between the recording and playhead and the line, and means coupling the switching means to one of the spools so that rotation of the spool when the driving means are energized and tape is driven from the supply spool to the take-up spool causes the switching means to effect a predetermined sequence of switching operations in synchronism with the rotation of the spool and the movement of the tape, the said switching operations serving to ensure that an amplifier input is coupled to the head and an amplifier output is coupled to the line whilst a section of tape bearing an answering announcement is passing the head and that these couplings are reversed when a section of tape intermediate the recorded announcements is passing the head, said switching means being connected during rewinding of the tape from the take-up spool to the supply spool so that the condition of the connections of the switching means are always synchronized with the passage of the announcements and recorded messages on the tape past the head.

26. A telephone answering and recording device as claimed in claim 25 wherein the switching means comprise a switching shaft which is formed with cam means and an electrically conductive contact member which is movable lengthwise thereof by the cam means upon rotation of the switching shaft, the said contact member being movable between a position wherein the member forms an electrical connection between a pair of contacts and a position wherein the contacts are electrically insulated from one another.

27. A telephone answering and recording device as claimed in claim 25, wherein the driving means include a capstan and a cooperating pressure roller which engage the tape at a location on the path intermediate the spools.

28. A telephone answering and recording device as claimed in claim 25, wherein means are provided for transmitting a predetermined signal to the telephone line, and the switching means are adapted to effect operation of the transmitting means at or near the beginning of a period wherein an intermediate section of the tape is passing the head.

29. A telephone answering and recording device as claimed in claim 25, wherein the driving means include a driving element which is coupled to the take-up or supply spool and, in operation, effects rotation thereof to drive tape from the supply to the take-up spool.

30. The device of claim 29 wherein the driving means are coupled to the take-up spool.

31. The device of claim 25 wherein the switching means include a rotary element and said pair of electrical contacts are associated with the element, and the said coupling means couple the element to the said one of the spools in such manner that rotation of the spool causes rotation of the rotary element to vary the electrical connections between the contacts and thereby to effect the predetermined sequence of switching operation.

32. The device of claim 31 wherein the switching means include a relay winding and power supply means which are connected in series with the said electrical contacts whereby the winding is energized when the rotary element causes the contacts to be electrically connected together and relay contacts associated with the winding then serve to effect the said coupling of the amplifier input and output to the head and line, respectively, and the said reversal of these couplings.

33. The device of claim 25 further including means for identifying the connection condition of said switching means.

34. The device of claim 33 wherein said identifying means is a visual indicator.

35. The device of claim 33 wherein the rotary element is a cylindrical element rotatable about the axis thereof and having predetermined areas of its cylindrical surface respectively formed of electrically conductive and nonconductive material, and the electrical contacts engage the cylindrical surface, said pair of contacts being electrically connected together when both engage an area of conductive material and electrically insulated from one another when one or both engage an area of electrically nonconductive material.

36. The device of claim 35 wherein the rotary element is formed from a laminate of an electrically conductive sheet and an electrically nonconductive sheet, the laminate then being folded into the form of a hollow cylinder with the conductive sheet radially outwardly of the nonconductive sheet and parts of the conductive sheet being removed to expose parts of the nonconductive sheet.

References Cited

UNITED STATES PATENTS

| | | | |
|---|---|---|---|
| 3,208,682 | 9/1965 | Pastor | 179—100.2 |
| 2,928,898 | 3/1960 | Salzberg | 179—6 |
| 3,248,956 | 5/1966 | Kuhn | 220—153 |
| 2,783,303 | 2/1957 | Fountaine | 179—6 |
| 952,778 | 3/1910 | Wohl | 60—24 |
| 3,188,407 | 6/1965 | Augerinos | 200—24 |
| 3,110,775 | 11/1963 | Harrington | 200—24 |

J. RUSSELL GOUDEAU, Primary Examiner

U.S. Cl. X.R.

179—100.2